United States Patent
Kobayashi et al.

(10) Patent No.: US 10,066,131 B2
(45) Date of Patent: Sep. 4, 2018

(54) HOT-MELT ADHESIVE FOR WOODWORKING

(71) Applicant: IDEMITSU KOSAN CO., LTD., Chiyoda-ku (JP)

(72) Inventors: Kenji Kobayashi, Chiba (JP); Hiroki Fujinami, Narashino (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 15/527,364

(22) PCT Filed: Nov. 19, 2015

(86) PCT No.: PCT/JP2015/082597
§ 371 (c)(1),
(2) Date: May 17, 2017

(87) PCT Pub. No.: WO2016/084715
PCT Pub. Date: Jun. 2, 2016

(65) Prior Publication Data
US 2017/0355888 A1    Dec. 14, 2017

(30) Foreign Application Priority Data

Nov. 28, 2014 (JP) ................................ 2014-241681

(51) Int. Cl.
*C08F 110/06*    (2006.01)
*C09J 123/12*    (2006.01)
*C09J 11/08*    (2006.01)

(52) U.S. Cl.
CPC ........... *C09J 123/12* (2013.01); *C08F 110/06* (2013.01); *C09J 11/08* (2013.01); *C09J 2423/04* (2013.01)

(58) Field of Classification Search
CPC .... C08F 110/06; C09J 123/12; C09J 2423/04; C08L 2205/025
See application file for complete search history.

(56) References Cited

U.S. PATENT DOCUMENTS

| | | | |
|---|---|---|---|
| 8,366,865 B2 | 2/2013 | Terfloth et al. | |
| 9,109,143 B2 | 8/2015 | Tse et al. | |
| 9,598,615 B2 * | 3/2017 | Fujinami | C08F 110/06 |
| 2003/0096896 A1 | 5/2003 | Wang et al. | |
| 2013/0225752 A1 * | 8/2013 | Tse | C08L 23/10 |
| | | | 524/505 |

FOREIGN PATENT DOCUMENTS

| | | |
|---|---|---|
| JP | 2000-226561 A | 8/2000 |
| JP | 2005-505679 A | 2/2005 |
| JP | 2013-64055 A | 4/2013 |
| JP | 2013-540867 A | 11/2013 |
| JP | 2014/129301 A1 | 8/2014 |
| WO | 2014/077258 A1 | 5/2014 |

OTHER PUBLICATIONS

International Search Report dated Feb. 9, 2016 in PCT/JP2015/082597 filed Nov. 19, 2015.

* cited by examiner

*Primary Examiner* — Mark S Kaucher
(74) *Attorney, Agent, or Firm* — Oblon, McClelland, Maier & Neustadt, L.L.P.

(57) ABSTRACT

Provided is a hot-melt adhesive for woodworking, containing a component (a) of an olefinic polymer (A) having a specific tensile modulus of elasticity and a specific glass transition temperature (Tg), and a component (b) of an olefinic polymer (B) having a specific glass transition temperature (Tg), wherein the content of the component (a) is 31 to 95% by mass relative to 100% by mass of the total amount of the component (a) and the component (b).

12 Claims, No Drawings

HOT-MELT ADHESIVE FOR WOODWORKING

TECHNICAL FIELD

The present invention relates to a hot-melt adhesive for woodworking, and to a method for using the same.

BACKGROUND ART

A hot-melt adhesive is a solvent-free adhesive and has a characteristic that instant bonding and high-speed bonding can be achieved since adhesiveness is exhibited after the adhesive is melted by heating and coated onto an adherend, followed by cooling to solidify the adhesive, and therefore has been used in a wide range of fields. Not only adherends to be bonded with such a hot-melt adhesive but also the conditions of use thereof are various. At present, various hot-melt adhesives for use in various applications have been developed and supplied to the market. Also for the conditions of use, various operating temperatures ranging from low temperatures to high temperatures are considered, and recently, hot-melt adhesives excellent in heat resistance have become desired.

For example, PTL 1 discloses a hot-melt adhesive for use in woodworking or cabinetmaking, which contains a mixture prepared by mixing two copolymers produced using a different metallocene catalyst and having a different melt flow index, in a specific blending ratio, at least one polymer, at least one resin and/or at least one wax, and an additive.

PTL 2 discloses a hot-melt adhesive containing 1 to 30 parts by mass of a propylenic polymer satisfying a specific stereoregularity relative to 100 parts by mass of an ethylenic polymer therein.

PTL 3 discloses a hot-melt adhesive containing a propylene homopolymer obtained through polymerization of propylene using a metallocene catalyst and having a melting point of 100° C. or lower, and an ethylenic copolymer.

CITATION LIST

Patent Literature

PTL 1: U.S. Pat. No. 8,366,865
PTL 2: WO 2014/077258
PTL 3: JP 2013-64055 A

SUMMARY OF INVENTION

Technical Problem

However, in the case of a hot-melt adhesive obtained using a mixture of copolymers that are obtained using a metallocene catalyst and have a different melt flow index, and an additional polymer (preferably a polymer selected from an amorphous poly-α-olefin, a thermoplastic polyurethane, an ethylene/(meth)acrylate copolymer, an ethylene/vinyl acetate copolymer, and a mixture thereof) like in PTL 1, the hot-melt adhesive has a problem in that the heat resistance and the cohesive force thereof are not sufficient.

PTL 2 says that the hot-melt adhesive obtained therein is excellent in heat resistance and has a suitable open time, but when the adhesive is used for woodworking, further improvement of the adhesion power thereof is required.

It is not clear as to whether or not the hot-melt adhesive disclosed in PTL 3 could be used for woodworking.

The present invention has been made in consideration of the above-mentioned situation, and an object of the present invention is to provide a hot-melt adhesive for woodworking that has high flowability while in melt and has an excellent adhesion strength.

Solution to Problem

The present inventors have assiduously studied and, as a result, have found that, by using a hot-melt adhesive for woodworking, which contains a component (a) of an olefinic polymer (A) having a specific tensile modulus of elasticity and a specific glass transition temperature (hereinafter this may be simply referred to as "Tg"), and a component (b) of an olefinic polymer (B) having a specific Tg, and in which the content of the component (a) is 31 to 95% by mass relative to 100% by mass of the total amount of the component (a) and the component (b), the above-mentioned problems can be solved. The present invention has been completed on the basis of these findings.

Specifically, according to the present invention, there are provided a hot-melt adhesive for woodworking and a bonding method, as described below.

[1] A hot-melt adhesive for woodworking, containing the following component (a) and component (b), wherein the content of the component (a) is 31 to 95% by mass relative to 100% by mass of the total amount of the component (a) and the component (b):

(a) a propylenic polymer (A) having a tensile modulus of elasticity, as measured using a tensile tester and according to JIS K 7113, of 1 to 600 MPa, and having a glass transition temperature (Tg), as measured by keeping 10 mg of a sample of the polymer in a nitrogen atmosphere at −10° C. for 5 minutes and then heating the sample at 10° C./min using a differential scanning calorimeter (DSC), of higher than −10° C.; and (b) an olefinic polymer (B) having a glass transition temperature (Tg), as measured by keeping 10 mg of a sample of the polymer in a nitrogen atmosphere at −10° C. for 5 minutes and then heating the sample at 10° C./min using a differential scanning calorimeter (DSC), of −10° C. or lower.

[2] The hot-melt adhesive for woodworking according to the above [1], wherein the content of the component (a) is 35 to 95% by mass relative to 100% by mass of the total amount of the component (a) and the component (b).

[3] The hot-melt adhesive for woodworking according to the above [1] or [2], wherein 70 mol % or more of the monomer constituting the propylenic polymer (A) is a propylene monomer.

[4] The hot-melt adhesive for woodworking according to any one of the above [1] to [3], wherein the propylenic polymer (A) satisfies the following (1):

(1) [mmmm]=20 to 80 mol %.

[5] The hot-melt adhesive for woodworking according to any one of the above [1] to [4], wherein the propylenic polymer (A) satisfies at least one of the following (2) to (5):

(2) [rrrr]/(1-[mmmm]) 0.1;
(3) [rmrm]≥2.5 mol %;
(4) [mm]×[rr]/[mr]²≤2.0; and
(5) Molecular weight distribution (Mw/Mn)<4.0.

[6] The hot-melt adhesive for woodworking according to any one of the above [1] to [5], wherein the propylenic polymer (A) satisfies the following (6):

(6) The melting point (Tm-D) of the polymer, defined as the peak top observed on the highest temperature side in a melting endothermic curve obtained using a differential scanning calorimeter (DSC), keeping a sample of the polymer in a nitrogen atmosphere at −10° C. for 5 minutes, and then heating the sample at 10° C./min, is 0 to 120° C.

[7] The hot-melt adhesive for woodworking according to any one of the above [1] to [6], wherein the olefinic polymer (B) is an olefinic copolymer (P) obtained through polymerization of ethylene and one or more monomers selected from α-olefins each having 3 to 20 carbon atoms.

[8] The hot-melt adhesive for woodworking according to the above [7], wherein 10 mol % or more of the monomer constituting the olefinic copolymer (P) is an ethylene monomer.

[9] The hot-melt adhesive for woodworking according to the above [7], wherein the olefinic polymer (P) satisfies at least one of the following (p1) to (p3):

(p1) an ethylene structural unit is contained in an amount of 10 mol % or more and 20 mol % or less;

(p2) a 1-butene structural unit is contained in an amount of 20 mol % or more and 30 mol % or less; and (p3) a propylene structural unit is contained in an amount of 50 mol % or more and 70 mol % or less.

[10] The hot-melt adhesive for woodworking according to any one of the above [1] to [9], containing two or more kinds of the propylenic polymer (A).

[11] The hot-melt adhesive for woodworking according to any one of the above [1] to [10], further containing a tackifier resin (C).

[12] A method of bonding woodworking substrates using at least one type of substrate for woodworking, including a step of melting the hot-melt adhesive for woodworking of any one of the above [1] to [11], and applying the melt to a substrate for woodworking or to any other substrate, and a step of bonding a substrate for woodworking or any other substrate to the coated hot-melt adhesive.

Advantageous Effects of Invention

According to the present invention, there is provided a hot-melt adhesive for woodworking which has high flowability while in melt and has an excellent adhesion strength.

DESCRIPTION OF EMBODIMENTS

The present invention is described hereinunder. In this description, the numerical range expressed by the wording "a number to another number" means the range that falls between the former number indicating the lower limit of the range and the latter number indicating the upper limit thereof.

Also in this description, the component (a) and the propylenic polymer (A) have the same meaning, the component (b) and the olefinic polymer (B) have the same meaning, and the component (c) and the tackifier resin (C) have the same meaning.

[Hot-Melt Adhesive for Woodworking]

The hot-melt adhesive for woodworking of the present invention contains the following component (a) and component (b), wherein the content of the component (a) is 31 to 95% by mass relative to 100% by mass of the total amount of the component (a) and the component (b).

(a) A propylenic polymer (A) having a tensile modulus of elasticity, as measured using a tensile tester and according to JIS K 7113, of 1 to 600 MPa, and having a glass transition temperature (Tg), as measured by keeping 10 mg of a sample of the polymer in a nitrogen atmosphere at −10° C. for 5 minutes and then heating the sample at 10° C./min using a differential scanning calorimeter (DSC), of higher than −10° C.

(b) An olefinic polymer (B) having a glass transition temperature (Tg), as measured by keeping 10 mg of a sample of the polymer in a nitrogen atmosphere at −10° C. for 5 minutes and then heating the sample at 10° C./min using a differential scanning calorimeter (DSC), of −10° C. or lower.

When the content of the component (a) is less than 31% by mass relative to 100% by mass of the total amount of the component (a) and the component (b), the cohesive force of the hot-melt adhesive lowers and the hot-melt adhesive could not have a sufficient adhesive strength enough for woodworking. On the other hand, when the content of the component (a) is more than 95% by mass relative to 100% by mass of the total amount of the component (a) and the component (b), the adhesive strength at low temperatures is poor. From these viewpoints, the content of the component (a) relative to the total amount, 100% by mass of the component (a) and the component (b) is preferably 35% by mass or more, more preferably 50% by mass or more, even more preferably 70% by mass or more, and is preferably 90% by mass or less, more preferably 85% by mass or less.

Hereinunder the components for use in the present invention and the production method are described sequentially.

<Propylenic Polymer (A)>

The propylenic polymer (A) of the component (a) for use in the present invention has a tensile modulus of elasticity, as measured using a tensile tester according to JIS K 7113, of 1 to 600 MPa.

From the viewpoint of adhesiveness, specifically, the tensile modulus of elasticity is preferably 5 MPa or more, more preferably 10 MPa or more.

In the case where a wood substrate is used as an adherend, from the viewpoint of the followability of the hot-melt adhesive for woodworking to the adherend and from the viewpoint of the adhesiveness thereof to irregularities of the adherend surface, the hot-melt adhesive for woodworking is required to have suitable flowability and flexibility. From these viewpoints, the tensile modulus of elasticity is preferably lower, and the tensile modulus of elasticity of the propylenic polymer (A) at 23° C. is 600 MPa or less, preferably 350 MPa or less, more preferably 300 MPa or less, even more preferably 250 MPa or less, still more preferably 200 MPa or less, further more preferably 150 MPa or less.

The propylenic polymer (A) of the component (a) for use in the present invention has a glass transition temperature (Tg), as measured by keeping 10 mg of a sample of the polymer in a nitrogen atmosphere at −10° C. for 5 minutes and then heating the sample at 10° C./min using a differential scanning calorimeter (DSC), of higher than −10° C.

When the glass transition temperature (Tg) is −10° C. or lower, the cohesive force is poor and the adhesive strength of the hot-melt adhesive for woodworking lowers.

From the viewpoint of the cohesive force, the glass transition temperature is preferably −8° C. or higher, more preferably −5° C. or higher. From the viewpoint of improving the adhesive strength at low temperatures, the glass transition temperature is preferably 20° C. or lower, more preferably 10° C. or lower.

The tensile modulus of elasticity and the glass transition temperature (Tg) may be controlled to fall within a desired range by varying the polymerization condition (reaction temperature, reaction time, catalyst, promoter) for the propylenic polymer (A) or by adding additives.

Specifically, the tensile modulus of elasticity and the glass transition temperature (Tg) are values measured according to the methods described in the section of Examples.

The propylenic polymer (A) for use in the present invention is a propylenic polymer having a propylene unit as the main component, and is a propylene homopolymer or a propylene copolymer of such that 50 mol % or more, preferably 70 mol % or more, more preferably 95% or more of the monomer constituting the propylenic polymer is a propylene monomer. The propylenic polymer (A) may be used as one alone of a propylene homopolymer, or as a mixture of two or more kinds of propylene homopolymers differing in molecular weight or stereoregularity, or may also be used as a mixture of one or more propylene homopolymers and one or more propylene copolymer.

The other comonomer than propylene in the propylenic copolymer includes ethylene and $\alpha$-olefins each having 4 or more carbon atoms (preferably $\alpha$-olefins each having 4 to 24 carbon atoms, more preferably 4 to 12 carbon atoms, even more preferably 4 to 8 carbon atoms). Specific examples of the $\alpha$-olefins include 1-butene, 1-pentene, 4-methyl-1-pentene, 1-hexene, 1-octene, 1-decene, 1-dodecene, 1-tetradecene, 1-hexadecene, 1-octadecene, 1-eicosene, etc. In the present invention, one or two or more of these may be used.

Preferably, the other comonomer than propylene constituting the propylenic copolymer accounts for 5 mol % or less.

The propylenic polymer (A) in the present invention is preferably a propylenic polymer satisfying the following (1), more preferably further satisfying at least one of the following (2) to (5), and even more preferably further satisfying the following (6):
(1) [mmmm]=20 to 80 mol %,
(2) [rrrr]/(1−[mmmm])≤0.1,
(3) [rmrm]≥2.5 mol %,
(4) [mm]×[rr]/[mr]$^2$≤2.0,
(5) Molecular weight distribution (Mw/Mn)<4.0,
(6) The melting point (Tm-D) of the polymer, defined as the peak top observed on the highest temperature side in a melting endothermic curve obtained using a differential scanning calorimeter (DSC), and keeping a sample of the polymer in a nitrogen atmosphere at −10° C. for 5 minutes, and then heating the sample at 10° C./min, is 0 to 120° C.

In the above, [mmmm] represents a meso pentad fraction, [rrrr] represents a racemic pentad fraction, [rmrm] represents a racemic meso racemic meso pentad fraction, [mm] represents a meso triad fraction, [rr] represents a racemic triad fraction, and [mr] represents a meso racemic triad fraction.

In the present invention, the meso pentad fraction [mmmm] and the racemic meso racemic meso pentad fraction [rmrm] are determined in accordance with the method proposed in "Macromolecules, 6, 925 (1973)" by A. Zambelli et al., and are a meso fraction and a racemic meso racemic meso fraction in a pentad unit in a polypropylene molecular chain measured with the signal of a methyl group in the $^{13}$C-NMR spectrum.

The measurement of the $^{13}$C-NMR spectrum is carried out using the following device under the following conditions.
Device: $^{13}$C-NMR spectrometer, JNM-EX400 series manufactured by JEOL, Ltd.
Method: proton complete decoupling method
Concentration: 220 mg/mL
Solvent: a mixed solvent of 1,2,4-trichlorobenzene and deuterated benzene at 90:10 (volume ratio)
Temperature: 130° C.
Pulse width: 45°
Pulse repetition time: 4 seconds
Accumulation: 10,000 times $$M=m/S\times 100$$

$$R=\gamma/S\times 100$$

$$S=P\beta\beta+P\beta\beta+P\alpha\gamma \qquad \text{<Calculation Formulae>}$$

S: signal intensity of carbon atoms of side-chain methyl in all propylene units
P$\beta\beta$: 19.8 to 22.5 ppm
P$\alpha\beta$: 18.0 to 17.5 ppm
P$\alpha\gamma$: 17.5 to 17.1 ppm
$\gamma$: racemic pentad chain: 20.7 to 20.3 ppm
m: meso pentad chain: 21.7 to 22.5 ppm Further, in the present invention, the weight-average molecular weight (Mw) and the number-average molecular weight (Mn) are a weight-average molecular weight and a number-average molecular weight in terms of polystyrene measured using the following device under the following conditions. The molecular weight distribution (Mw/Mn) is a value calculated from the weight-average molecular weight (Mw) and the number-average molecular weight (Mn).
<GPC Measuring Device>
Column: TOSO GMHHR-H(S)HT
Detector: RI detector for liquid chromatography, Waters 150C
<Measurement Conditions>
Solvent: 1,2,4-trichlorobenzene
Measurement temperature: 145° C.
Flow rate: 1.0 mL/min
Sample concentration: 2.2 mg/mL
Injection amount: 160 µL
Calibration curve: Universal Calibration
Analysis software: HT-GPC (ver. 1.0)
(1) Meso Pentad Fraction [mmmm]
The meso pentad fraction [mmmm] is an index of indicating stereoregularity, and a polymer having a larger meso pentad fraction [mmmm] has a higher degree of stereoregularity.

When the meso pentad fraction [mmmm] of the propylenic polymer (A) is 20 mol % or more, the hot-melt adhesive is excellent in cohesive force. When [mmmm] is 80 mol % or less, the hot-melt adhesive exhibits good wettability for an adherend. From the viewpoint of wettability of the hot-melt adhesive for an adherend, the meso pentad fraction [mmmm] of the propylenic polymer (A) is preferably 20 to 80 mol %, more preferably 30 to 70 mol %, even more preferably 40 to 70 mol %, still more preferably 40 to 60 mol %.

On the other hand, from the viewpoint of the balance between the cohesive force of the hot-melt adhesive and suitable wettability thereof for an adherend, the meso pentad fraction [mmmm] is preferably more than 60 mol % and 80 mol % or less, more preferably more than 60 mol % and 75 mol % or less, even more preferably more than 60 mol % and 72 mol % or less.

By controlling the monomer concentration and the reaction pressure, the meso pentad fraction can be controlled.
(2) [rrrr]/(1−[mmmm])
The value of [rrrr]/(1−[mmmm]) can be obtained from the meso pentad fraction [mmmm] and the racemic pentad fraction [rrrr], and is an index of indicating regularity distribution evenness of the propylenic polymer. One having a large value of [rrrr]/(1−[mmmm]) is a mixture of a high-stereoregularity polypropylene and an atactic polypropylene such as a conventional polypropylene produced using an already-existing catalyst system, and causing stickiness of the propylenic polymer (A). The unit of [rrrr] and [mmmm] in the above is mol %.

The value of [rrrr]/(1−[mmmm]) of the propylenic polymer (A) is, from the viewpoint of stickiness, preferably 0.1 or less, more preferably 0.001 to 0.05, even more preferably 0.001 to 0.04, still more preferably 0.01 to 0.04.

Here, the meso pentad fraction [mmmm] and the racemic pentad fraction [rrrr], and the racemic meso racemic meso pentad fraction [rmrm] to be mentioned below are determined in accordance with the method proposed in "Macromolecules, 6, 925 (1973)" by A. Zambelli et al., and are a meso fraction, a racemic fraction and a racemic meso racemic meso fraction in a pentad unit in a polypropylene molecular chain measured with the signal of a methyl group in the $^{13}$C-NMR spectrum thereof. When the meso pentad fraction [mmmm] is large, the stereoregularity increases. The triad fractions [mm], [rr] and [mr] to be mentioned below are also calculated according to the above-mentioned method.

(3) Racemic Meso Racemic Meso Pentad Fraction [rmrm]

The racemic meso racemic meso pentad fraction [rmrm] is an index of indicating the stereoregularity randomness of a propylenic polymer, and a larger value thereof indicates increase in randomness of a propylenic polymer.

When the racemic meso racemic meso fraction [rmrm] is 2.5 mol % or more, the randomness increases, and the hot-melt adhesive can exhibit good cohesive force. From this viewpoint, the racemic meso racemic meso pentad fraction [rmrm] of the propylenic polymer (A) is preferably 2.5 mol % or more, more preferably 2.6 mol % or more, even more preferably 2.7 mol % or more. The upper limit is generally preferably 10 mol % or so, more preferably 7 mol %, even more preferably 5 mol %, and still more preferably 4 mol %.

(4) $[mm] \times [rr]/[mr]^2$

The value of $[mm] \times [rr]/[mr]^2$ that is calculated from the triad fractions [mm], [rr] and [mr] indicates an index of the randomness of a polymer, and when the value is nearer to 1, the randomness of the polymer is higher. The value of the above expression of the propylenic polymer (A) is preferably 2 or less, more preferably within a range of 1.8 to 0.5, even more preferably 1.5 to 0.5. The unit of [mm] and [rr] in the above is mol %.

(5) Molecular Weight Distribution (Mw/Mn)

When the molecular weight distribution of the propylenic polymer (A) is less than 4, the hot-melt adhesive is excellent in coatability. The molecular weight distribution (Mw/Mn) of the propylenic polymer (A) is preferably 2.5 or less, more preferably 2.4 or less, even more preferably 2.2 or less. By using a metallocene catalyst, the molecular weight distribution (Mw/Mn) can be controlled to be less than 4.

(6) Melting Point (Tm-D)

The melting point (Tm-D) of the propylenic polymer (A) for use in the present invention is, from the viewpoint of flowability, preferably from 0 to 120° C., more preferably from 20 to 110° C., even more preferably from 40 to 100° C.

In the present invention, the peak top of a peak observed on the highest temperature side in a melting endothermic curve obtained by using a differential scanning calorimeter (manufactured by PerkinElmer Co., Ltd., DSC-7), and keeping 10 mg of a sample in a nitrogen atmosphere at −10° C. for 5 minutes, and then raising the temperature at 10° C./min is defined as the melting point (Tm-D).

The melting point (Tm-D) can be controlled by suitably controlling the monomer concentration or the reaction pressure.

Also preferably, the melt viscosity at 190° C. of the propylenic polymer (A) for use in the present invention, as described below, is 1.5 Pa·s or more, and 100 Pa·s or less. When the viscosity falls within the range, the hot-melt adhesive using the propylenic polymer (A) can be made to be a hot-melt adhesive excellent in the balance of more suitable flowability and better adhesiveness.

The melt viscosity at 190° C. is a value measured according to the method described in the section of Examples.

(Production Method for Propylenic Polymer (A))

Examples of the production method for the propylenic polymer (A) for use in the present invention include a production method for a propylene homopolymer by homopolymerization of propylene using a metallocene catalyst and a production method for a propylene copolymer by copolymerization of propylene and ethylene and/or an α-olefin having 4 or more carbon atoms using a metallocene catalyst.

Examples of the metallocene-based catalyst include catalysts obtained by combining a transition metal compound containing one or two ligands selected from a cyclopentadienyl group, a substituted cyclopentadienyl group, an indenyl group, a substituted indenyl group, and the like as described in JP S58-19309 A, JP S61-130314 A, JP H03-163088 A, JP H04-300887 A, JP H04-211694 A, JP H01-502036 A, and the like, or a transition metal compound, in which the above ligand is geometrically controlled, with a promoter.

In the present invention, among the metallocene catalysts, a case where a catalyst is composed of a transition metal compound in which a ligand forms a crosslinked structure through a crosslinking group is preferred, and above all, a method using a metallocene catalyst obtained by combining a transition metal compound, in which a crosslinked structure is formed through two crosslinking groups, with a promoter is more preferred.

Specific examples of the method include a method of homopolymerizing propylene and a method of copolymerizing propylene and ethylene and/or an α-olefin having 4 or more carbon atoms, wherein the homopolymerization or the copolymerization is carried out in the presence of a polymerization catalyst containing (i) a transition metal compound represented by the general formula (I), and (ii) a component selected from (ii-1) a compound capable of reacting with the transition metal compound as the component (i) or a derivative thereof to form an ionic complex and (ii-2) an aluminoxane.

(I)

In the formula, M represents a metal element of Groups 3 to 10 of the Periodic Table or a metal element of the lanthanoid series. $E^1$ and $E^2$ each represent a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group, and a silicon-containing group, and form a crosslinked structure through $A^1$ and $A^2$, and further, $E^1$ and $E^2$ may be the same as or different from each other; X represents a σ-bonding ligand, and when plural X's are present, plural X's may be the same as or different from each other and may be crosslinked with any other X, $E^1$, $E^2$, or Y; Y represents a Lewis base, and when plural Y's are present, plural Y's may be the same as or different from each other and may be crosslinked with any other Y, $E^1$, $E^2$, or X; $A^1$ and $A^2$ are each a divalent crosslinking group, which bonds two ligands, and each represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —$SO_2$—, —Se—, —$NR^1$—, —$PR^1$—, —$P(O)R^1$—, —$BR^{1-}$, or —$AlR^1$—, wherein $R^1$ represents a hydrogen atom, a halogen atom, a hydrocarbon group having 1 to 20 carbon atoms, or a halogen-containing hydrocarbon group having 1 to 20 carbon atoms, and $A^1$ and $A^2$ may be the same as or different from each other; q is an integer of 1 to 5 and represents [(the atomic valence of M)−2]; and r represents an integer of 0 to 3.

In the above general formula (I), M represents a metal element of Groups 3 to 10 of the Periodic Table or a metal element of the lanthanoid series, and specific examples thereof include titanium, zirconium, hafnium, yttrium, vanadium, chromium, manganese, nickel, cobalt, palladium, and lanthanoid series metals. Among these, from the viewpoint of the olefin polymerization activity or the like, metal elements of Group 4 of the Periodic Table are preferred, and particularly, titanium, zirconium, and hafnium are preferred.

$E^1$ and $E^2$ each represent a ligand selected from a substituted cyclopentadienyl group, an indenyl group, a substituted indenyl group, a heterocyclopentadienyl group, a substituted heterocyclopentadienyl group, an amide group (—N<), a phosphine group (—P<), a hydrocarbon group [>CR—, >C<], and a silicon-containing group [>SiR—, >Si<] (wherein R is hydrogen atom, or a hydrocarbon group having 1 to 20 carbon atoms or a heteroatom-containing group), and form a crosslinked structure through $A^1$ and $A^2$. $E^1$ and $E^2$ may be the same as or different from each other. As $E^1$ and $E^2$, a substituted cyclopentadienyl group, an indenyl group, and a substituted indenyl group are preferred. Examples of the substituent include a hydrocarbon group having 1 to 20 carbon atoms and a silicon-containing group.

Further, X represents an σ-bonding ligand, and in the case where plural X's are present, plural X's may be the same as or different from each other and may be crosslinked with any other X, $E^1$, $E^2$, or Y. Specific examples of this X include a halogen atom, a hydrocarbon group having 1 to 20 carbon atoms, an alkoxy group having 1 to 20 carbon atoms, an aryloxy group having 6 to 20 carbon atoms, an amide group having 1 to 20 carbon atoms, a silicon-containing group having 1 to 20 carbon atoms, a phosphide group having 1 to 40 carbon atoms, a sulfide group having 1 to 20 carbon atoms, and an acyl group having 1 to 20 carbon atoms.

Examples of the halogen atom include a chlorine atom, a fluorine atom, a bromine atom, and an iodine atom. Specific examples of the hydrocarbon group having 1 to 20 carbon atoms include an alkyl group such as a methyl group, an ethyl group, a propyl group, a butyl group, a hexyl group, a cyclohexyl group, and an octyl group; an alkenyl group such as a vinyl group, a propenyl group, and a cyclohexenyl group; an arylalkyl group such as a benzyl group, a phenylethyl group, and a phenylpropyl group; and an aryl group such as a phenyl group, a tolyl group, a dimethylphenyl group, a trimethylphenyl group, an ethylphenyl group, a propylphenyl group, a biphenyl group, a naphthyl group, a methylnaphthyl group, an anthracenyl group, and a phenanthryl group. Above all, an alkyl group such as a methyl group, an ethyl group, and a propyl group; and an aryl group such as a phenyl group are preferred.

Examples of the alkoxy group having 1 to 20 carbon atoms include an alkoxy group such as a methoxy group, an ethoxy group, a propoxy group, and a butoxy group; a phenylmethoxy group, and a phenylethoxy group. Examples of the aryloxy group having 6 to 20 carbon atoms include a phenoxy group, a methylphenoxy group, and a dimethylphenoxy group. Examples of the amide group having 1 to 20 carbon atoms include an alkylamide group such as a dimethylamide group, a diethylamide group, a dipropylamide group, a dibutylamide group, a dicyclohexylamide group, and a methylethylamide group; an alkenylamide group such as a divinylamide group, a dipropenylamide group, and a dicyclohexenylamide group; an arylalkylamide group such as a dibenzylamide group, a phenylethylamide group, and a phenylpropylamide group; and an arylamide group such as a diphenylamide group and a dinaphthylamide group.

Examples of the silicon-containing group having 1 to 20 carbon atoms include a mono-hydrocarbon-substituted silyl group such as a methylsilyl group and a phenylsilyl group; a dihydrocarbon-substituted silyl group such as a dimethylsilyl group and a diphenylsilyl group; a trihydrocarbon-substituted silyl group such as a trimethylsilyl group, a triethylsilyl group, a tripropylsilyl group, a tricyclohexylsilyl group, a triphenylsilyl group, a dimethylphenylsilyl group, a methyldiphenylsilyl group, a tritolylsilyl group, and a trinaphthylsilyl group; a hydrocarbon-substituted silyl ether group such as a trimethylsilyl ether group; a silicon-substituted alkyl group such as a trimethylsilylmethyl group; and a silicon-substituted aryl group such as a trimethylsilylphenyl group. Above all, a trimethylsilylmethyl group, a phenyldimethylsilylethyl group, and the like are preferred.

Examples of the phosphide group having 1 to 40 carbon atoms include a dialkyl phosphide group such as a dimethyl phosphide group, a diethyl phosphide group, a dipropyl phosphide group, a dibutyl phosphide group, a dihexyl phosphide group, a dicyclohexyl phosphide group, and a dioctyl phosphide group; a dialkenyl phosphide group such as a divinyl phosphide group, a dipropenyl phosphide group, and a dicyclohexenyl phosphide group; a bis(arylalkyl) phosphide group such as a dibenzyl phosphide group, a bis(phenylethyl) phosphide group, and a bis(phenylpropyl) phosphide group; and a diaryl phosphide group such as a diphenyl phosphide group, a ditolyl phosphide group, a bis(dimethylphenyl) phosphide group, a bis(trimethylphenyl) phosphide group, a bis(ethylphenyl) phosphide group, a bis(propylphenyl) phosphide group, a bis(biphenyl) phosphide group, a bis(naphthyl) phosphide group, a bis(methylnaphthyl) phosphide group, a bis(anthracenyl) phosphide group, and a bis(phenanthryl) phosphide group.

Examples of the sulfide group having 1 to 20 carbon atoms include an alkyl sulfide group such as a methyl sulfide group, an ethyl sulfide group, a propyl sulfide group, a butyl sulfide group, a hexyl sulfide group, a cyclohexyl sulfide group, and an octyl sulfide group; an alkenyl sulfide group such as a vinyl sulfide group, a propenyl sulfide group, and a cyclohexenyl sulfide group; an arylalkyl sulfide group such as a benzyl sulfide group, a phenylethyl sulfide group, and a phenylpropyl sulfide group; and an aryl sulfide group such as a phenyl sulfide group, a tolyl sulfide group, a dimethylphenyl sulfide group, a trimethylphenyl sulfide group, an ethylphenyl sulfide group, a propylphenyl sulfide group, a biphenyl sulfide group, a naphthyl sulfide group, a methylnaphthyl sulfide group, an anthracenyl sulfide group, and a phenanthryl sulfide group.

Examples of the acyl group having 1 to 20 carbon atoms include an alkylacyl group such as a formyl group, an acetyl group, a propionyl group, a butyryl group, a valeryl group, a palmitoyl group, a stearoyl group, and an oleoyl group; an arylacyl group such as a benzoyl group, a toluoyl group, a salicyloyl group, a cinnamoyl group, a naphthoyl group, and a phthaloyl group; and an oxalyl group, a malonyl group, and a succinyl group, which are derived from oxalic acid, malonic acid, and succinic acid, each being a dicarboxylic acid, respectively.

On the other hand, Y represents a Lewis base, and in the case where plural Y's are present, plural Y's may be the same as or different from each other and may be crosslinked with any other Y, $E^1$, $E^2$, or X. Specific examples of the Lewis base represented by Y include amines, ethers, phosphines, and thioethers.

Examples of the amines include amines having 1 to 20 carbon atoms, and specific examples thereof include alkylamines such as methylamine, ethylamine, propylamine, butylamine, cyclohexylamine, methylethylamine, dimethylamine, diethylamine, dipropylamine, dibutylamine, and dicyclohexylamine; alkenylamines such as vinylamine, propenylamine, cyclohexenylamine, divinylamine, dipropenylamine, and dicyclohexenylamine; arylalkylamines such as phenylethylamine, and phenylpropylamine; and arylamines such as phenylamine, diphenylamine, and dinaphthylamine Examples of the ethers include aliphatic monoether compounds such as methyl ether, ethyl ether, propyl ether, isopropyl ether, butyl ether, isobutyl ether, n-amyl ether, and isoamyl ether; aliphatic mixed ether compounds such as methylethyl ether, methylpropyl ether, methylisopropyl ether, methyl-n-amyl ether, methylisoamyl ether, ethylpropyl ether, ethylisopropyl ether, ethylbutyl ether, ethylisobutyl ether, ethyl-n-amyl ether, and ethylisoamyl ether; aliphatic unsaturated ether compounds such as vinyl ether, allyl ether, methylvinyl ether, methylallyl ether, ethylvinyl ether, and ethylallyl ether; aromatic ether compounds such as anisole, phenetole, phenyl ether, benzyl ether, phenylbenzyl ether, α-naphthyl ether, and β-naphthyl ether; and cyclic ether compounds such as ethylene oxide, propylene oxide, trimethylene oxide, tetrahydrofuran, tetrahydropyran, and dioxane Examples of the phosphines include phosphines having 1 to 30 carbon atoms. Specific examples thereof include alkyl phosphines including monohydrocarbon-substituted phosphines such as methyl phosphine, ethyl phosphine, propyl phosphine, butyl phosphine, hexyl phosphine, cyclohexyl phosphine, and octyl phosphine; dihydropcarbon-substituted phosphines such as dimethyl phosphine, diethyl phosphine, dipropyl phosphine, dibutyl phosphine, dihexyl phosphine, dicyclohexyl phosphine, and dioctyl phosphine; trihydrocarbon-substituted phosphines such as trimethyl phosphine, triethyl phosphine, tripropyl phosphine, tributyl phosphine, trihexyl phosphine, tricyclohexyl phosphine, and trioctyl phosphine; monoalkenyl phosphines such as vinyl phosphine, propenyl phosphine, and cyclohexenyl phosphine; dialkenyl phosphines in which two hydrogen atoms of phosphine are each substituted with alkenyl; trialkenyl phosphines in which three hydrogen atoms of phosphine are each substituted with alkenyl; and arylphosphines including arylalkyl phosphines such as benzyl phosphine, phenylethyl phosphine, and phenylpropyl phosphine; diarylalkyl phosphines or aryldialkyl phosphines in which three hydrogen atoms of phosphine are each substituted with aryl or alkenyl; phenyl phosphine, tolyl phosphine, dimethylphenyl phosphine, trimethylphenyl phosphine, ethylphenyl phosphine, propylphenyl phosphine, biphenyl phosphine, naphthyl phosphine, methylnaphthyl phosphine, anthracenyl phosphine, and phenanthryl phosphine; di(alkylaryl) phosphines in which two hydrogen atoms of phosphine are each substituted with alkylaryl; and tri(alkylaryl)phosphines in which three hydrogen atoms of phosphine are each substituted with alkylaryl. Examples of the thioethers include the above-mentioned sulfides.

Next, $A^1$ and $A^2$ are each a divalent crosslinking group, which bonds two ligands, and each represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —$SO_2$—, —Se—, —$NR^1$—, —$PR^1$—, —$P(O)R^1$—, —$BR^1$—, or —$AlR^1$—, wherein $R^1$ represents a hydrogen atom, a halogen atom, a hydrocarbon group having 1 to 20 carbon atoms, or a halogen-containing hydrocarbon group having 1 to 20 carbon atoms, and $A^1$ and $A^2$ may be the same as or different from each other. Examples of such a crosslinking group include a group represented by the following general formula (II).

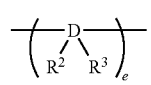

(II)

wherein D is carbon, silicon, or tin. $R^2$ and $R^3$ are each a hydrogen atom or a hydrocarbon group having 1 to 20 carbon atoms, and may be the same as or different from each other, or may be bonded to each other to form a ring structure. e represents an integer of 1 to 4.

Specific examples thereof include a methylene group, an ethylene group, an ethylidene group, a propylidene group, an isopropylidene group, a cyclohexylidene group, a 1,2-cyclohexylene group, a vinylidene ($CH_2$=C=) group, a dimethylsilylene group, a diphenylsilylene group, a methylphenylsilylene group, a dimethylgermylene group, a dimethylstannylene group, a tetramethyldisilylene group, and a diphenyldisilylene group. Among these, an ethylene group, an isopropylidene group, and a dimethylsilylene group are preferred.

q is an integer of 1 to 5 and represents [(the atomic valence of M)−2], and r represents an integer of 0 to 3.

Specific examples of the transition metal compound represented by the general formula (I) include the specific examples described in WO 02/16450 as preferred examples also in the present invention.

More preferred specific examples thereof include (1,2'-dimethylsilylene)(2,1'-dimethylsilylene)bis(indenyl)zirconium dichloride, (1,2'-dimethylsilylene)(2,1'-dimethylsilylene)(indenyl)(3-trimethylsilylmethylindenyl)zirconium dichloride, and (1,2'-dimethylsilylene)(2,1'-dimethylsilylene)bis(3-trimethylsilylmethylindenyl)zirconium dichloride.

Next, any compound can be used as the component (ii-1) in the components (ii) as long as it is a compound which can be reacted with the transition metal compound as the component (i) described above to form an ionic complex, however, a compound represented by the following general formula (III) or (IV) can be preferably used:

  (III)

  (IV)

wherein $L^2$ is $M^2$, $R^{11}R^{12}M^3$, $R^{13}{}_3C$, or $R^{14}M^3$.

In the above general formulae (III) and (IV), $L^1$ represents a Lewis base, $[Z]^-$ represents a non-coordinating anion $[Z^1]^-$ or $[Z^2]^-$.

$[Z^1]^-$ represents an anion in which plural groups are bonded to an element, that is, $[M^1G^1G^2 \ldots G^f]^-$. Here, $M^1$ represents an element of Groups 5 to 15 of the Periodic Table, preferably an element of Groups 13 to 15 of the Periodic Table. $G^1$ to $G^f$ each represent a hydrogen atom, a halogen atom, an alkyl group having 1 to 20 carbon atoms, a dialkylamino group having 2 to 40 carbon atoms, an alkoxy group having 1 to 20 carbon atoms, an aryl group having 6 to 20 carbon atoms, an aryloxy group having 6 to 20 carbon atoms, an alkylaryl group having 7 to 40 carbon atoms, an arylalkyl group having 7 to 40 carbon atoms, a halogen-substituted hydrocarbon group having 1 to 20 carbon atoms, an acyloxy group having 1 to 20 carbon atoms, an organic metalloid group, or a heteroatom-containing hydrocarbon group having 2 to 20 carbon atoms. Two or more groups of $G^1$ to $G^f$ may form a ring. f represents an integer of [(the atomic valence of the central metal $M^1$)+1].

$[Z^2]^-$ represents a conjugate base of a Bronsted acid alone in which the logarithm (pKa) of an inverse number of an acid dissociation constant is −10 or less or a combination of a Bronsted acid and a Lewis acid, or a conjugate base of an acid generally defined as an ultrastrong acid. Further, a Lewis base may be coordinated.

$R^{10}$ represents a hydrogen atom, an alkyl group having 1 to 20 carbon atoms, an aryl group having 6 to 20 carbon atoms, an alkylaryl group, or an arylalkyl group.

$R^{11}$ and $R^{12}$ each represent a cyclopentadienyl group, a substituted cyclopentadienyl group, an indenyl group, or a fluorenyl group.

$R^{13}$ represents an alkyl group having 1 to 20 carbon atoms, an aryl group, an alkylaryl group, or an arylalkyl group.

$R^{14}$ represents a large cyclic ligand such as tetraphenylporphyrin or phthalocyanine. k is the ionic valence of each of $[L^1-R^{10}]$ and $[L^2]$, and represents an integer of 1 to 3, a represents an integer of 1 or more, and b is (k×a). $M^2$ includes an element of Groups 1 to 3, 11 to 13, and 17 of the Periodic Table, and $M^3$ represents an element of Groups 7 to 12 of the Periodic Table.

Here, specific examples of $L^1$ include amines such as ammonia, methylamine, aniline, dimethylamine, diethylamine, N-methyl aniline, diphenylamine, N,N-dimethylaniline, trimethylamine, triethylamine, tri-n-butylamine, methyldiphenylamine, pyridine, p-bromo-N,N-dimethylaniline, and p-nitro-N,N-dimethylaniline; phosphines such as triethylphosphine, triphenylphosphine, and diphenylphosphine; thioethers such as tetrahydrothiophene; esters such as ethyl benzoate; and nitriles such as acetonitrile and benzonitrile.

Specific examples of $R^{10}$ include hydrogen, a methyl group, an ethyl group, a benzyl group, and a trityl group. Specific examples of $R^{11}$ and $R^{12}$ include a cyclopentadienyl group, a methylcyclopentadienyl group, an ethylcyclopentadienyl group, and a pentamethylcyclopentadienyl group. Specific examples of $R^{13}$ include a phenyl group, a p-tolyl group, and a p-methoxyphenyl group. Specific examples of $R^{14}$ include teteraphenylporphine, phthalocyanine, allyl, and metallyl. Specific examples of $M^2$ include Li, Na, K, Ag, Cu, Br, I, and $I_3$. Specific examples of $M^3$ include Mn, Fe, Co, Ni, and Zn.

Further, in $[Z^1]^-$, that is, $[M^1G^1G^2 \ldots G^f]$, specific examples of $M^1$ include B, Al, Si, P, As, and Sb, and preferred examples thereof include B and Al. Specific examples of $G^1$, $G^2$ to $G^f$ include a dialkylamino group such as a dimethylamino group and a diethylamino group; an alkoxy group or an aryloxy group such as a methoxy group, an ethoxy group, an n-butoxy group, and a phenoxy group; a hydrocarbon group such as a methyl group, an ethyl group, an n-propyl group, an isopropyl group, an n-butyl group, an isobutyl group, an n-octyl group, an n-eicosyl group, a phenyl group, a p-tolyl group, a benzyl group, a 4-t-butylphenyl group, and a 3,5-dimethylphenyl group; a halogen atom such as fluorine, chlorine, bromine, and iodine; a heteroatom-containing hydrocarbon group such as a p-fluorophenyl group, a 3,5-difluorophenyl group, a pentachlorophenyl group, a 3,4,5-trifluorophenyl group, a pentafluorophenyl group, a 3,5-bis(trifluoromethyl)phenyl group, and a bis(trimethylsilyl)methyl group; and an organic metalloid group such as a pentamethylantimony group, a trimethylsilyl group, a trimethylgermyl group, a diphenylarsine group, a dicyclohexylantimony group, and diphenylboron.

Also, specific examples of the non-coordinating anion, that is, the conjugate base $[Z^2]^-$ of a Bronsted acid alone having a pKa of −10 or less or a combination of a Bronsted acid with a Lewis acid include a trifluoromethanesulfonic acid anion $(CF_3SO_3)^-$, a bis(trifluoromethanesulfonyl)methyl anion, a bis(trifluoromethanesulfonyl)benzyl anion, bis(trifluoromethanesulfonyl)amide, a perchloric acid anion $(ClO_4)^-$, a trifluoroacetic acid anion $(CF_3CO_2)$, a hexafluoroantimony anion $(SbF_6)$, a fluorosulfonic acid anion $(FSO_3)$, a chlorosulfonic acid anion $(ClSO_3)^-$, a fluorosulfonic acid anion/an antimony pentafluoride $(FSO_3/SbF_5)^-$, a fluorosulfonic acid anion/arsenic pentafluoride $(FSO_3/AsF_5)^-$, and trifluoromethanesulfonic acid/antimony pentafluoride $(CF_3SO_3/SbF_5)^-$.

Specific examples of the ionic compound which is reacted with the transition metal compound as the component (i) described above to form an ionic complex, that is, the compound as the component (ii-1) include tri ethyl ammonium tetraphenylborate, tri-n-butylammonium tetraphenylborate, trimethylammonium tetraphenylborate, tetraethyl ammonium tetraphenylborate, methyl(tri-n-butyl)ammonium tetraphenylborate, benzyl(tri-n-butyl)ammonium tetraphenylborate, dimethyldiphenyl ammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethyl ammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenylborate), benzyl(tri-n-butyl)ammonium tetrakis(pentafluorophenyl)borate, methyl diphenylammonium tetrakis(pentafluorophenyl)borate, triphenyl(methyl)ammonium tetrakis(pentafluorophenyl)borate, methyl anilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl(2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis[bis(3,5-ditrifluoromethyl)phenyl]borate, ferrocenium tetraphenylborate, silver tetraphenylborate, trityl tetraphenylborate, tetraphenylporphyrinmanganese tetraphenylborate, ferrocenium tetrakis (pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis (pentafluorophenyl)borate, tetraphenylporphyrinmanganese tetrakis(pentafluorophenyl)borate, silver tetrafluoroborate, silver hexafluorophosphate, silver hexafluoroarsenate, silver perchlorate, silver trifluoroacetate, and silver trifluoromethanesulfonate.

As (ii-1), one type may be used or two or more types may be used in combination.

On the other hand, examples of the aluminoxane as the component (ii-2) include a chain aluminoxane represented by the general formula (V):

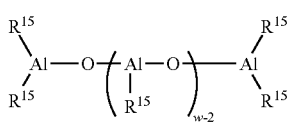

(V)

wherein $R^{15}$ represents a hydrocarbon group having 1 to 20 carbon atoms, preferably 1 to 12 carbon atoms, such as an alkyl group, an alkenyl group, an aryl group, or an arylalkyl group or a halogen atom; and w represents an average polymerization degree and is an integer of usually 2 to 50, preferably 2 to 40, provided that the respective $R^{15}$'s may be the same as or different from each other,
and a cyclic aluminoxane represented by the general formula (VI):

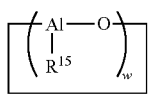

(VI)

wherein $R^{15}$ and w are the same as those in the above general formula (V).

Examples of the production method for the aluminoxane described above include a method in which alkylaluminum is brought into contact with a condensing agent such as water, but a means thereof is not particularly limited, and they may be reacted according to a known method.

Examples of the Method Include:

(1) a method in which an organic aluminum compound is dissolved in an organic solvent, and then the resulting solution is brought into contact with water, (2) a method in which an organic aluminum compound is first added when carrying out polymerization, and then water is added thereto, (3) a method in which an organic aluminum compound is reacted with crystal water contained in a metal salt or the like, or water adsorbed on an inorganic substance or an organic substance, (4) a method in which trialkylaluminum is reacted with tetraalkyldialuminoxane and the reaction product is further reacted with water. The aluminoxane may be an aluminoxane which is insoluble in toluene.

Among these aluminoxanes, one type may be used or two or more types may be used in combination.

It is desired that the use proportion of the catalyst component (i) to the catalyst component (ii) is in the range of preferably 10:1 to 1:100, more preferably 2:1 to 1:10 in terms of molar ratio when the compound (ii-1) is used as the catalyst component (ii), and if it deviates from the above range, the catalyst cost per unit mass of the polymer increases, so that it is not practical. When the compound (ii-2) is used, it is desired that the use proportion is in the range of preferably 1:1 to 1:1,000,000, more preferably 1:10 to 1:10,000 in terms of molar ratio. If it deviates from the above range, the catalyst cost per unit mass of the polymer increases, so that it is not practical. Further, as the catalyst component (ii), (ii-1) and (ii-2) can be used alone or two or more types can be used in combination.

In the polymerization catalyst in the above production method, an organic aluminum compound as a component (iii) can be used in addition to the component (i) and the component (ii) described above.

Here, as the organic aluminum compound serving as the component (iii), a compound represented by the general formula (VII) is used:

(VII)

wherein, $R^{16}$ represents an alkyl group having 1 to 10 carbon atoms, J represents a hydrogen atom, an alkoxy group having 1 to 20 carbon atoms, an aryl group having 6 to 20 carbon atoms, or a halogen atom, and v is an integer of 1 to 3.

Specific examples of the compound represented by the above general formula (VII) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, di ethyl aluminum hydride, and ethyl aluminum sesquichloride Among these organic aluminum compounds, one type may be used or two or more types may be used in combination.

In the production method, preliminary contact can also be carried out using the component (i), the component (ii), and the component (iii) described above. The preliminary contact can be carried out by, for example, bringing the component (ii) into contact with the component (i), but the method is not particularly limited, and a known method can be used. This preliminary contact is effective in the reduction in the catalyst cost due to the improvement of the catalyst activity, the reduction in the use proportion of the component (ii) which is a promoter, etc. Further, by bringing the component (i) into contact with the component (ii-2), an effect of improving the molecular weight can be exhibited in addition to the effect described above. The preliminary contact temperature is usually from −20° C. to 200° C., preferably from −10° C. to 150° C., more preferably from 0° C. to 80° C. In the preliminary contact, an aliphatic hydrocarbon, an aromatic hydrocarbon, or the like can be used as an inert hydrocarbon serving as a solvent. Among these, an aliphatic hydrocarbon is particularly preferred.

It is desired that the use proportion of the catalyst component (i) to the catalyst component (iii) is in the range of preferably 1:1 to 1:10,000, more preferably 1:5 to 1:2,000, further more preferably 1:10 to 1:1,000 in terms of molar ratio. By using the catalyst component (iii), the polymerization activity per transition metal can be improved, however, if the amount thereof is too much, the organic aluminum compound is not only wasted, but also remains in a large amount in the polymer, and therefore, the excessive amount thereof is not preferred.

In the present invention, at least one of the catalyst components can be carried on a suitable carrier and used. The type of the carrier is not particularly limited, and any of an inorganic oxide carrier, an inorganic carrier other than the inorganic oxide carrier, and an organic carrier can be used. However, in particular, an inorganic oxide carrier or an inorganic carrier other than the inorganic oxide carrier is preferred.

Specific examples of the inorganic oxide carrier include $SiO_2$, $Al_2O_3$, MgO, $ZrO_2$, $TiO_2$, $Fe_2O_3$, $B_2O_3$, CaO, ZnO, BaO, $ThO_2$, and mixtures thereof such as silica alumina, zeolite, ferrite, and glass fiber. Among these, $SiO_2$ and $Al_2O_3$ are particularly preferred. The inorganic oxide carrier described above may contain a small amount of a carbonate, a nitrate, a sulfate, or the like.

On the other hand, examples of the carrier other than those described above include magnesium compounds represented by the general formula: $MgR^{17}{}_xX^1{}_y$ typified by $MgCl_2$, $Mg(OC_2H_5)_2$, and the like, and complex salts thereof. Here, $R^{17}$ represents an alkyl group having 1 to 20 carbon atoms, an alkoxy group having 1 to 20 carbon atoms, or an aryl group having 6 to 20 carbon atoms, $X^1$ represents a halogen atom or an alkyl group having 1 to 20 carbon atoms, x is 0 to 2, y is 0 to 2, and x+y=2. The respective $R^{17}$'s or the respective $X^1$'s may be the same as or different from each other.

Further, examples of the organic carrier include polymers such as polystyrene, styrene-divinylbenzene copolymers, polyethylene, poly(l-butene), substituted polystyrene, and polyallylate, as well as starch and carbon.

As the carrier to be used in the production method described above, $MgCl_2$, $MgCl(OC_2H_5)$, $Mg(OC_2H_5)_2$, $SiO_2$, $Al_2O_3$, and the like are preferred. The properties of the carrier vary depending on the type thereof and the production method, however, the average particle diameter is usually from 1 to 300 preferably from 10 to 200 more preferably from 20 to 100 μm.

If the particle diameter is small, a fine powder in the polymer increases, and if the particle diameter is large, a coarse particle in the polymer increases to cause a reduction in the bulk density or the clogging of a hopper.

The carrier has a specific surface area of usually 1 to 1,000 $m^2/g$, preferably 50 to 500 $m^2/g$, and a pore volume of usually 0.1 to 5 $cm^3/g$, preferably 0.3 to 3 $cm^3/g$.

If either of the specific surface area and the pore volume deviates from the above range, the catalyst activity decreases in some cases. The specific surface area and the pore volume can be determined, for example, from the volume of adsorbed nitrogen gas according to a BET method.

Further, in the case where the carrier is an inorganic oxide carrier, it is desired that the carrier is preferably used after it is fired at usually 150 to 1,000° C., preferably 200 to 800° C.

In the case where at least one of the catalyst components is carried on the carrier described above, it is desired to carry at least one of the catalyst component (i) and the catalyst component (ii), preferably both of the catalyst component (i) and the catalyst component (ii) on the carrier.

The method for carrying at least one of the component (i) and the component (ii) on the carrier is not particularly limited, however, for example, (1) a method in which at least one of the component (i) and the component (ii) is mixed with the carrier, (2) a method in which the carrier is treated with an organic aluminum compound or a halogen-containing silicon compound, and then at least one of the component (i) and the component (ii) is mixed therewith in an inert solvent, (3) a method in which the carrier, the component (i) and/or the component (ii), and an organic aluminum compound or a halogen-containing silicon compound are reacted with one another, (4) a method in which the component (i) or the component (ii) is carried on the carrier, and then the component (ii) or the component (i) is mixed therewith, (5) a method in which a catalytic reaction product of the component (i) and the component (ii) is mixed with the carrier, (6) a method in which the carrier is allowed to coexist in the catalytic reaction of the component (i) and the component (ii), or the like can be used.

In the reactions in the above (4), (5), and (6), it is also possible to add the organic aluminum compound as the component (iii).

In the present invention, the catalyst may be prepared by irradiation with an elastic wave when the components (i), (ii), and (iii) described above are brought into contact. As the elastic wave, generally a sonic wave, preferably an ultrasonic wave can be used. To be specific, an ultrasonic wave with a frequency of 1 to 1,000 kHz, preferably an ultrasonic wave with a frequency of 10 to 500 kHz can be used.

The catalyst thus obtained may be used for polymerization after the solvent is evaporated off and the catalyst in the form of a solid is taken out or may be used for polymerization as it is.

Further, in the present invention, the catalyst can be produced by performing an operation of carrying at least one of the component (i) and the component (ii) on the carrier in the polymerization system. For example, a method in which at least one of the component (i) and the component (ii), and the carrier, and, if necessary, the organic aluminum compound as the component (iii) are added, and an olefin such as ethylene is added at an atmospheric pressure to 2 MPa (gauge) to carry out preliminary polymerization at −20 to 200° C. for about one minute to two hours, thereby forming catalyst particles can be used.

In the present invention, it is desired that the use proportion of the component (ii-1) to the carrier is preferably from 1:5 to 1:10,000, more preferably from 1:10 to 1:500 in terms of mass ratio, and the use proportion of the component (ii-2) to the carrier is preferably from 1:0.5 to 1:1,000, more preferably from 1:1 to 1:50 in terms of mass ratio. In the case where two or more components as the components (ii) are mixed and used, it is desired that the use proportion of each of the components (ii) to the carrier is in the above range in terms of mass ratio. Further, it is desired that the use proportion of the component (i) to the carrier is preferably from 1:5 to 1:10,000, more preferably from 1:10 to 1:500 in terms of mass ratio.

If the use proportion of the component (ii) [the component (ii-1) or the component (ii-2)] to the carrier or the use proportion of the component (i) to the carrier deviates from the above range, the activity decreases in some cases. The thus prepared polymerization catalyst has an average particle diameter of usually 2 to 200 μm, preferably 10 to 150 μm, more preferably 20 to 100 μm, and has a specific surface area of usually 20 to 1,000 $m^2/g$, preferably 50 to 500 $m^2/g$. If the average particle diameter is less than 2 μm, a fine powder in the polymer increases in some cases, and if the average particle diameter exceeds 200 μm, a coarse particle in the polymer increases in some cases. If the specific surface area is less than 20 $m^2/g$, the activity decreases in some cases, and if the specific surface area exceeds 1,000 $m^2/g$, the bulk density of the polymer decreases in some cases. Further, in the catalyst, the amount of the transition metal in 100 g of the carrier is usually from 0.05 to 10 g, particularly preferably from 0.1 to 2 g. If the amount of the transition metal is outside of the above range, the activity decreases in some cases.

An industrially advantageous polymer having a high bulk density and an excellent particle size distribution can be obtained by carrying the catalyst on the carrier in the manner described above.

As the propylenic polymer (A) in the present invention, by using the polymerization catalyst described above, a propylene homopolymer can be produced by homopolymerization of propylene, or a propylene copolymer can be produced by copolymerization of propylene and ethylene and/or an α-olefin having 4 or more carbon atoms.

In this case, the polymerization method is not particularly limited, and any method such as a slurry polymerization method, a gas-phase polymerization method, a bulk polymerization method, a solution polymerization method, or a suspension polymerization method may be used, however, a slurry polymerization method and a gas-phase polymerization method are preferred. Further, from the viewpoint of the ease of control of the reaction, a solution polymerization method is preferred.

With respect to the polymerization conditions, the polymerization temperature is usually from −100 to 250° C., preferably from −50 to 200° C., more preferably from 0 to 130° C. With respect to the use proportion of the catalyst to the reaction starting material, the starting material monomer/the component (i) described above (molar ratio) is preferably from $10^5$ to $10^8$, particularly preferably from $10^6$ to $10^7$. The polymerization time is usually from 5 minutes to 10 hours, and the reaction pressure is preferably from an atmospheric pressure to 3 MPa (gauge), more preferably from an atmospheric pressure to 2.5 MPa (gauge), further more preferably from an atmospheric pressure to 2 MPa (gauge). By adjusting the reaction pressure, the meso pentad fraction can be controlled.

Examples of the method for controlling the molecular weight of the polymer include selection of the type of the respective catalyst components, the use amount, or the polymerization temperature, and polymerization in the presence of hydrogen.

In the case of using a polymerization solvent, for example, an aromatic hydrocarbon such as benzene, toluene, xylene, or ethylbenzene; an alicyclic hydrocarbon such as cyclopentane, cyclohexane, or methylcyclohexane; an aliphatic hydrocarbon such as pentane, hexane, heptane, or octane; a halogenated hydrocarbon such as chloroform or dichloromethane, or the like can be used. Among these solvents, one type may be used alone or two or more types may be used in combination. Further, a monomer such as an α-olefin may be used as the solvent. The polymerization can be carried out without using a solvent depending on the polymerization method.

In the polymerization, preliminary polymerization can be carried out using the polymerization catalyst described above. The preliminary polymerization can be carried out by bringing, for example, a small amount of an olefin into contact with the solid catalyst component. However, the method is not particularly limited, and a known method can be used. The olefin to be used for the preliminary polymerization is not particularly limited, and for example, ethylene, an α-olefin having 3 to 20 carbon atoms, a mixture thereof, or the like can be used. However, it is advantageous to use the same olefin as used in the polymerization.

The preliminary polymerization temperature is usually from −20 to 200° C., preferably from −10 to 130° C., more preferably from 0 to 80° C. In the preliminary polymerization, an aliphatic hydrocarbon, an aromatic hydrocarbon, starting monomers for the propylenic polymer (A) and others can be used as a solvent. Among these, an aliphatic hydrocarbon is particularly preferred. The preliminary polymerization may be carried out without using a solvent.

In the preliminary polymerization, it is desired to control the conditions so that the limiting viscosity [η] (measured in decalin at 135° C.) of the preliminary polymerization product is 0.2 dL/g or more, particularly 0.5 dL/g or more, and the amount of the preliminary polymerization product per millimole of the transition metal component in the catalyst is from 1 to 10,000 g, particularly from 10 to 1,000 g.

The content of the propylenic polymer (A) is, as described above, and from the viewpoint of adhesive strength, 31% by mass or more relative to 100% by mass of the total amount of the propylenic polymer (A) and the olefinic polymer (B) to be mentioned hereinunder, preferably 35% by mass or more, more preferably 45% by mass or more, even more preferably 70% by mass or more, and is, from the viewpoint of improving adhesive strength at low temperatures, 95% by mass or less, preferably 90% by mass or less, more preferably 85% by mass or less.

The content of the propylenic polymer (A) is, from the viewpoint of adhesive strength, preferably 31% by mass or more relative to 100% by mass of the hot-melt adhesive, more preferably 40% by mass or more, even more preferably 50% by mass or more, and is preferably 95% by mass or less, more preferably 85% by mass or less, even more preferably 75% by mass or less.

<Olefinic Polymer (B)>

The olefinic polymer (B) of the component (b) for use in the present invention has a glass transition temperature (Tg), as measured by keeping 10 mg of a sample of the polymer in a nitrogen atmosphere at −10° C. for 5 minutes and then heating the sample at 10° C./min using a differential scanning calorimeter (DSC), of −10° C. or lower.

From the viewpoint of improving adhesive strength at low temperatures, the glass transition temperature is preferably −20° C. or lower, more preferably −30° C. or lower.

The glass transition temperature may be controlled to fall within a desired range by varying the polymerization condition (reaction temperature, reaction time, catalyst, promoter) for the olefinic polymer (B), or by controlling the copolymerization ratio or by adding an additive.

Specifically, the glass transition temperature (Tg) is a value measured according to the method described in the section of Examples.

Specifically, the olefinic polymer (B) for use in the present invention is preferably an ethylene-propylene copolymer or an olefinic copolymer (P) produced through polymerization of ethylene and one or more monomers selected from an α-olefin having 3 to 20 carbon atoms, and is more preferably a copolymer of ethylene, propylene and 1-butene.

Examples of the α-olefin having 3 to 20 carbon atoms include propylene, isobutene, 1-butene, 1-pentene, 4-methyl-1-pentene, 1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, etc. Among these, an α-olefin having 3 to 12 carbon atoms is preferred, an α-olefin having 3 to 6 carbon atoms is more preferred, an α-olefin having 3 to 5 carbon atoms is even more preferred, and an α-olefin having 3 to 4 carbon atoms is further more preferred. Among these, one, two or more may be used.

In the case where the olefinic copolymer (P) is (p1) a copolymer containing ethylene, the constituent unit of the ethylene monomer preferably accounts for 10 mol % or more, more preferably more than 10 mol % and 20 mol % or less. In the case where the copolymer is (p2) a copolymer containing 1-butene, the 1-butene content is preferably more than 0 mol %, more preferably 20 mol % or more and 30 mol % or less. In the case where the copolymer is (p3) a copolymer containing propylene, the constituent unit of the propylene monomer preferably accounts for 50 mol % or more and preferably 70 mol % or less.

Preferably, the olefinic copolymer (P) satisfies at least one of the requirements (p1) to (p3), more preferably all of (p1) to (p3).

The above-mentioned polymer may be a polymer using a petroleum/coal-derived monomer, or may be a polymer using a biomass-derived monomer.

The olefinic polymer (B) for use in the present invention has a melt viscosity at 190° C., as described below, of preferably 1 Pa·s or more, more preferably 3 Pa·s or more, even more preferably 5 Pa·s or more, and preferably 150 Pa·s or less. Falling within the viscosity range, the hot-melt adhesive using the olefinic polymer (B) can be a hot-melt adhesive excellent in the balance between more suitable flowability and better adhesiveness.

Specifically, the melt viscosity at 190° C. is a value measured according to the method described in the section of Examples.

Examples of commercially available products of the olefinic polymer (B) for use in the present invention include "Exact" series (manufactured by Exxon Mobil Corporation), "Affinity Polymer" series (manufactured by The Dow Chemical Company), and "VESTOPLAST" series (manufactured by EVONIK Corporation), etc., and more preferred examples thereof include "VESTOPLAST" series (manufactured by EVONIK Corporation) (all are trade names).

The content of the olefinic polymer (B) is, from the viewpoint of obtaining a preferred adhesive strength at low temperatures, preferably 5% by mass or more relative to 100% by mass of the total amount of the propylenic polymer (A), more preferably 10% by mass or more, even more preferably 20% by mass or more, and is preferably 150% by mass or less, more preferably 100% by mass or less, even more preferably 80% by mass or less, still more preferably 50% by mass or less.

The content of the olefinic polymer (B) is, from the viewpoint of obtaining a preferred adhesive strength at low temperatures, preferably 5% by mass or more relative to 100% by mass of the total amount of the propylenic polymer (A) and the olefinic polymer (B), more preferably 10% by mass or more, even more preferably 20% by mass or more, and is preferably 69% by mass or less, more preferably 60% by mass or less, even more preferably 50% by mass or less, still more preferably 40% by mass or less.

The content of the olefinic polymer (B) is, from the viewpoint of obtaining a preferred adhesive strength at low temperatures, preferably 5% by mass or more relative to 100% by mass of the hot-melt adhesive, more preferably 10% by mass or more, even more preferably 13% by mass or more, and is preferably 69% by mass or less, more preferably 50% by mass or less, even more preferably 30% by mass or less.

Before mixed with the other components to be mentioned hereinunder, the propylenic polymer (A) and the olefinic polymer (B) may be previously mixed in melt, or may be mixed in melt along with the other components to be mentioned hereinunder. Regarding the melt-mixing method, the same method as the production method for a hot-melt adhesive for woodworking to be described below may be employed.

As the components in the hot-melt adhesive of the present invention, a mixture of the propylenic polymer (A) and the olefinic polymer (B) is referred to as a "base polymer". The content of the base polymer is, from the viewpoint of adhesive strength, preferably 36% by mass or more relative to 100% by mass of the hot-melt adhesive, more preferably 40% by mass or more, even more preferably 50% by mass or more, and is preferably 100% by mass or less, more preferably 95% by mass or less, even more preferably 80% by mass or less.

<Tackifier (C)>

The hot-melt adhesive for woodworking of the present invention may contain a tackifier resin (C).

Examples of the tackifier resin (C) include materials which are composed of a rosin derivative resin, a polyterpene resin, a petroleum resin, an oil-soluble phenolic resin, or the like and are in the form of a solid, a semi-solid, or a liquid at normal temperature. Among these materials, one type may be used alone or two or more types may be used in combination. In the present invention, in consideration of the compatibility with the base polymer, it is preferred to use a hydrogenated material. In particular, a hydrogenated petroleum resin material having excellent heat stability is more preferred.

Examples of commercially available products of the tackifier resin (C) include I-MARV P-125, I-MARV P-100, and I-MARV P-90 (all manufactured by Idemitsu Kosan Co., Ltd., "I-MARV" is a registered trademark), Yumex 1001 (manufactured by Sanyo Chemical Industries, Ltd., "Yumex" is a registered trademark), Hi-Rez T 1115 (manufactured by Mitsui Chemicals, Incorporated, "Hi-Rez" is a registered trademark), Clearon K 100 (manufactured by Yasuhara Chemical Co., Ltd., "Clearon" is a registered trademark), ECR 227 and Escorez 2101 (both manufactured by Tonex Co., Ltd., "Escorez" is a registered trademark), Arkon P-100 (manufactured by Arakawa Chemical Industries, Ltd., "Arkon" is a registered trademark), Regalrez 1078 (manufactured by Hercules, Inc., "Regalrez" is a registered trademark), and Eastotac H-130R (manufactured by Eastman Chemical Company), "Eastotac" is a registered trademark) (all are trade names).

From the viewpoint of improving adhesive strength, the content of the tackifier resin (C) is preferably 10% by mass or more relative to 100% by mass of the total amount of the propylenic polymer (A) and the olefinic polymer (B), more preferably 20% by mass or more, even more preferably 30% by mass or more, and is preferably 150% by mass or less, more preferably 120% by mass or less, even more preferably 100% by mass or less, still more preferably 80% by mass or less.

From the viewpoint of adhesive strength, the content of the tackifier resin (C) is preferably 10% by mass or more relative to 100% by mass of the hot-melt adhesive, more preferably 20% by mass or more, even more preferably 30% by mass or more, and is preferably 50% by mass or less, more preferably 40% by mass or less.

From the viewpoint of adhesive strength, the content of the tackifier resin (C) is preferably 20% by mass or more relative to 100% by mass of the olefinic polymer (A), more preferably 40% by mass or more, even more preferably 55% by mass or more, and is preferably 85% by mass or less, more preferably 75% by mass or less.

From the viewpoint of adhesive strength, the content of the tackifier resin (C) is preferably 80% by mass or more relative to 100% by mass of the olefinic polymer (B), more preferably 150% by mass or more, even more preferably 200% by mass or more, and is preferably 300% by mass or less, more preferably 250% by mass or less.

<Wax (D)>

The hot-melt adhesive for woodworking of the present invention may contain a wax (D).

Examples of the wax (D) include animal waxes, vegetable waxes, carnauba waxes, candelilla waxes, Japan waxes, beeswaxes, mineral waxes, petroleum waxes, paraffin waxes, microcrystalline waxes, petrolatum, polyethylene wax, polyethylene oxide wax, polypropylene wax, polypropylene oxide wax, higher fatty acid waxes, higher fatty acid ester waxes, and Fischer-Tropsch waxes.

From the viewpoint of the improvement of the flexibility and also the improvement of the wettability due to a decrease in the viscosity, the content of the wax (D) in the hot-melt adhesive for woodworking of the present invention is preferably 0.1% by mass or more relative to 100% by mass of the hot-melt adhesive, more preferably 3% by mass or more, even more preferably 5% by mass or more, and is preferably 40% by mass or less, more preferably 30% by mass or less.

<Additive>

Further, the hot-melt adhesive for woodworking of the present invention may contain a variety of additives such as a plasticizer, an inorganic filler, and an antioxidant as needed.

Examples of the plasticizer include paraffin-based process oils, naphthene-based process oils, phthalate esters, adipate esters, fatty acid esters, glycols, and epoxy-based polymer plasticizers.

Examples of the inorganic filler include clay, talc, calcium carbonate, barium carbonate, wollastonite, silica, mica, kaolin, titanium oxide, diatomaceous earth, urea resin, styrene beads, starch, barium sulfate, calcium sulfate, magnesium silicate, magnesium carbonate, alumina, and quartz powder.

Examples of the antioxidant include phosphorus-based antioxidants such as tris(nonylphenyl) phosphite, distearyl pentaerythritol diphosphite, Adekastab 1178 (manufactured by Adeka Corporation, "Adekastab" is a registered trademark), Sumilizer TNP (manufactured by Sumitomo Chemical Co., Ltd., "Sumilizer" is a registered trademark), Irgafos 168 (manufactured by BASF Co., Ltd., "Irgafos" is a registered trademark), and Sandostab P-EPQ (manufactured by Sandoz K.K., "Sandostab" is a registered trademark); phenolic antioxidants such as 2,6-di-t-butyl-4-methylphenol, n-octadecyl-3-(3',5'-di-t-butyl-4'-hydroxyphenyl)propionate, Sumilizer BHT (manufactured by Sumitomo Chemical Co., Ltd.), and Trganox 1010 (manufactured by BASF Co., Ltd., "Trganox" is a registered trademark); and sulfur-based antioxidants such as dilauryl-3,3'-thiodipropionate, pentaerythritol tetrakis(3-laurylthiopropionate), Sumilizer TPL (manufactured by Sumitomo Chemical Co., Ltd.), Yoshinox DLTP (manufactured by Yoshitomi Pharmaceutical Industries, Ltd., "Yoshinox" is a registered trademark), and AntiOx L (manufactured by NOF Corporation, "AntiOx" is a registered trademark).

<Characteristics of Hot-Melt Adhesive for Woodworking>

(Melt Viscosity of Hot-Melt Adhesive for Woodworking)

The melt viscosity at 180° C. of the hot-melt adhesive for woodworking of the present invention is, from the viewpoint of realizing an excellent effect of a balance between more suitable flowability and better adhesiveness, preferably 5 Pa·s or more, more preferably 7 Pa·s or more, even more preferably 8 Pa·s or more, and is preferably 13.5 Pa·s or less, more preferably 13 Pa·s or less.

Specifically, the melt viscosity at 180° C. is a value measured according to the method described in the section of Examples.

(Softening Point of Hot-Melt Adhesive for Woodworking)

The softening point of the hot-melt adhesive for woodworking of the present invention is, from the viewpoint of realizing an excellent effect of a balance between more suitable flowability and better adhesiveness, preferably 50° C. or higher, more preferably 70° C. or higher, even more preferably 80° C. or higher, and is preferably 140° C. or lower, more preferably 130° C. or lower.

The softening point of the hot-melt adhesive for woodworking is a value measured according to the method described in the section of Examples.

The hot-melt adhesive for woodworking is utilized for furniture and building materials by sticking a patterned paper or the like to the surface of a wood, and therefore in the case, the area of the adherend is large. Consequently, the hot-melt adhesive for woodworking is required to have a long open time and to realize a sufficient adhesive strength even in a case where the coating amount is small as the coating area is large. Using the propylenic polymer (A) having a high cohesive force in the hot-melt adhesive for woodworking, the hot-melt adhesive can readily penetrate into wood of an adherend, and is therefore expected to readily realize an anchor effect to improve adhesive strength. Accordingly, it is considered that the hot-melt adhesive for woodworking of the present invention can exert a sufficient adhesive strength even though its coating amount is small.

<Production Method for Hot-Melt Adhesive for Woodworking>

The hot-melt adhesive for woodworking of the present invention can be produced by dry-blending the propylenic polymer (A), the olefinic polymer (B) and optionally the tackifier resin (C), the wax (D) and a variety of additives using a Henschel mixer or the like, and stirring the components under heat using a stirring blade such as a rotary blade or the like in a heat-resistant container formed of stainless or the like, or melt-kneading them using a single-screw or twin-screw extruder, a Plast mill, a Banbury mixer, or the like.

[Bonding Method Using Hot-Melt Adhesive for Woodworking]

The hot-melt adhesive for woodworking of the present invention has high flowability and is excellent in coatability. The adhesive can be favorably used as an adhesive for packaging with corrugated boards, or an adhesive for woodworking.

The bonding method for woodworking of the present invention is a method for bonding a wood base material, and includes a step of melting the hot-melt adhesive for woodworking of the present invention and applying the adhesive onto a wood substrate or onto any other substrate, and a step of bonding a wood substrate or any other substrate to the applied hot-melt adhesive. However, at least one substrate to be used is a wood substrate.

Here, the wood substrate is not specifically limited so far as it is a material for woodworking. For example, the wood substrate is at least one or more selected from middle-density fiber boards (MDF), high-density fiber boards (HDF), papers produced from various woods, pulps and the like such as pine wood, flash panels, laminated lumbers, veneers, decorative laminates, plywood laminates, and other products using wood as the material; and not limited thereto, materials derived from various plants (for example, cellulose skeletons such as abaca, banana, sugar cane and the like to be used as pulp of a material of papers (as well as those derived from natural materials having a skeleton similar to these)), and materials using a part or all of them, and the surface to be bonded with the hot-melt adhesive for woodworking of the present invention may be formed of any one for use for woodworking.

The hot-melt adhesive for woodworking of the present invention has high flowability and is excellent in coatability, and can be therefore favorably used in a molding method of low-pressure molding or the like. Accordingly, the other substrates include, though not specifically limited thereto, plastic materials and metal materials that can be used for the above-mentioned materials.

EXAMPLES

Next, the present invention will be more specifically described with reference to Examples, but the present invention is by no means limited to these Examples.
[Evaluation of Propylenic Polymer (A) and Olefinic Polymer (B)]
Measurement methods for the propylenic polymer (A) and the olefinic polymer (B) used in Examples and Comparative Examples are described below.
[Measurement of Tensile Modulus of Elasticity]
A sample was press-molded to prepare a test piece, and the tensile modulus of elasticity thereof was measured according to JIS K 7113 under the following conditions.
Test piece (No. 2 dumbbell), thickness: 1 mm
Cross head rate: 100 mm/min
Load cell: 100 N
Measurement temperature: 23° C.
[DSC Measurement]
<Glass Transition Temperature (Tg) and Melting Point (Tm-D)>
Using a differential scanning calorimeter (manufactured by PerkinElmer Co., Ltd., DSC-7), 10 mg of a sample was kept in a nitrogen atmosphere at −10° C. for 5 minutes, and then heated at 10°/min. On the resultant melting endothermic curve, the glass transition temperature Tg was read. From the peak top of the peaks observed on the highest temperature side of the melting endothermic curve, the melting point (Tm-D) was determined.
(Glass Transition Temperature (Tg))
In the case where the endothermic curve varied twice or more in the endothermic direction in the resultant melting endothermic curve, the temperature corresponding to the position of the intersection of the extended line of the original base line at the site where the base line first shifted toward the endothermic direction, and the tangent line at the inflection point on the curve connecting the original base line and the base line after shifting (the point at which the upwardly-convexed curve changed to a downwardly-convexed curve) was read, and this is referred to as the glass transition temperature (Tg).
However, a case where the change of the base line whose shifting in the endothermic direction was confirmed first corresponds to the following melting point (Tm-D) (that is, a case where the curve movement in the endothermic direction was detected only once as an endothermic peak) is excluded.
(Melting Point (Tm-D))
From the peak top of the peaks observed on the highest temperature side of the resultant melting endothermic curve, the melting point (Tm-D) was determined.
[Measurement of Stereoregularity: NMR Measurement]
$^{13}$C-NMR spectrometry was carried out using the following device under the following conditions. For peak assignment, the method proposed in "Macromolecules, 8, 687 (1975)" by A. Zambelli, et al was referred to.

Device: $^{13}$C-NMR spectrometer, JNM-EX400 series manufactured by JEOL, Ltd.
Method: proton complete decoupling method
Concentration: 220 mg/mL
Solvent: a mixed solvent of 1,2,4-trichlorobenzene and deuterated benzene at 90:10 (volume ratio)
Temperature: 130° C.
Pulse width: 45°
Pulse repetition time: 4 seconds
Accumulation: 10,000 times $$M=m/S\times100$$

$$R=\gamma/S\times100$$

$$S=P\beta\beta+P\alpha\beta\pm P\alpha\gamma \qquad \text{<Calculation Formulae>}$$

S: signal strength of side-chain methyl carbon atom in all propylene units
Pββ: 19.8 to 22.5 ppm
Pαβ: 18.0 to 17.5 ppm
Pαγ: 17.5 to 17.1 ppm
γ: racemic pentad chain: 20.7 to 20.3 ppm
m: meso pentad chain: 21.7 to 22.5 ppm
The meso pentad fraction [mmmm], the racemic pentad fraction [rrrr], the racemic meso racemic meso pentad fraction [rmrm], and the triad fraction [mm], [rr] and [mr] are determined in accordance with the method proposed in "Macromolecules, 6, 925 (1973)" by A. Zambelli et al.
[Measurement of Weight-Average Molecular Weight (Mw) and Molecular Weight Distribution (Mw/Mn)]
The weight-average molecular weight (Mw) and the molecular weight distribution (Mw/Mn) were determined through gel permeation chromatography (GPC). In the measurement, the following device was used under the following conditions, and the weight-average molecular weight in terms of polystyrene was obtained.
<GPC Measuring Device>
Column: "TOSO GMHHR-H(S)HT" manufactured by Tosoh Corporation
Detector: RI detector for liquid chromatography, "Waters 150C" manufactured by Waters Corporation
<Measurement Conditions>
Solvent: 1,2,4-trichlorobenzene
Measurement temperature: 145° C.
Flow rate: 1.0 mL/min
Sample concentration: 2.2 mg/mL
Injection amount: 160 μL
Calibration curve: Universal Calibration
Analysis software: HT-GPC (ver. 1.0)
[Measurement of Limiting Viscosity (η)]
0.02 to 0.16 g/dL solutions were subjected to measurement at 135° C. using a viscometer (manufactured by RIGO Co., Ltd., trade name: "VMR-053U-PC•F01"), an Ubbelohde type viscosity tube (bulb volume in measurement: 2 to 3 mL, capillary diameter: 0.44 to 0.48 mm), and tetralin as the solvent.
[Measurement of Softening Point: Ring and Ball Method]
The softening point was measured according to the ring and ball method based on JAI7-1991.
[Melt Viscosity]
The melt viscosity was measured using TVB-15 type Brookfield rotary viscometer (with an M2 rotor) at 190° C. according to JIS K-6862.
Production Examples of propylenic polymers (A) used in Examples and Comparative Examples are described below.

<Propylenic Polymer (A)>

The following polymers were used as the propylenic polymer (A).

Production Example 1 and Production Example 2
(Production of propylenic polymer A1 and propylenic polymer A2)

To a stainless steel reactor having an internal volume of 20 L and equipped with a stirrer, n-heptane at 20 L/hr, triisobutylaluminum at 15 mmol/hr, and further a catalyst component prepared by previously bringing dimethylanilinium tetrakispentafluorophenyl borate, (1,2'-dimethylsilylene)(2,1'-dimethylsilylene)-bis(3-trimethylsilylmethylindenyl)zirconium dichloride, triisobutylaluminum and propylene in a ratio by mass of 1/1/2/20 into contact with one another at 6 μmol/hr in terms of zirconium were continuously supplied.

Then, propylene and hydrogen were continuously supplied thereto so that the total pressure in the reactor could be kept at 1.0 MPa·G and the polymerization temperature was suitably controlled to give a solution containing a polymer having a desired molecular weight shown in Table 1 below (hereinafter this may be referred to as "polymerization solution").

To the thus obtained polymerization solution, an antioxidant was added so that the content thereof in the polymerization solution could be 1,000 ppm by mass, and then the solvent was removed to give a propylenic polymer A1 or a propylenic polymer A2.

Production Examples of olefinic polymers (B) used in Examples and Comparative Examples are described below.

<Olefinic Polymer (B)>

The following polymers were used as the olefinic polymer (B).

(Olefinic Polymer B1)

"VESTOPLAST 828" (trade name, "VESTOPLAST" is a registered trademark, manufactured by Evonik Industries, ethylene(C2)/propylene(C3)/butene (C4) copolymer obtained through polymerization using a Ziegler Natta catalyst)

(Olefinic Polymer B2)

"VESTOPLAST 750" (trade name, manufactured by Evonik Industries, ethylene(C2)/propylene(C3)/butene (C4) copolymer obtained through polymerization using a Ziegler Natta catalyst)

(Olefinic Polymer B3)

"VESTOPLAST 891" (trade name, manufactured by Evonik Industries, ethylene(C2)/propylene(C3)/butene (C4) copolymer obtained through polymerization using a Ziegler Natta catalyst)

The propylenic polymers (A) and the olefinic polymers (B) were subjected to the measurement described above. The results are shown in Table 1 below.

TABLE 1

| Measurement Method | Properties | Unit | Propylenic Polymer (A) | | Olefinic Polymer (B) | | |
|---|---|---|---|---|---|---|---|
| | | | Propylenic Polymer A1 | Propylenic Polymer A2 | Olefinic Polymer B1 | Olefinic Polymer B2 | Olefinic Polymer B3 |
| NMR | Comonomer Amount [C2/C3/C4] | wt % | 0/100/0 | 0/100/0 | 14/64/22 | 11/66/23 | 16/63/21 |
| | [mmmm] | mol % | 47 | 49 | nd [*2] | nd [*2] | nd [*2] |
| | [rrrr]/(1 − [mmmm]) | — | 0.04 | 0.04 | nd [*2] | nd [*2] | nd [*2] |
| | [rmrm] | mol % | 2.5 | 2.5 | nd [*2] | nd [*2] | nd [*2] |
| | [mm] × [rr]/[mr]$^2$ | — | 1.5 | 1.6 | nd [*2] | nd [*2] | nd [*2] |
| Tensile Test [*1] | Tensile Modulus of Elasticity | MPa | 89 | 94 | nd [*2] | nd [*2] | nd [*2] |
| DSC | Tg | ° C. | −3 | −1 | ≤−10 [*3] | ≤−10 [*3] | ≤−10 [*3] |
| | Melting Point (Tm-D) | ° C. | 79 | 78 | 160 | 104 | 159 |
| Measurement of Limiting Viscosity | [η] | dl/g | 0.55 | 0.81 | 0.67 | 0.78 | 0.87 |
| GPC | Mw | — | 47,000 | 78,000 | 70,400 | 82,900 | 92,700 |
| | Mw/Mn | — | 1.8 | 1.8 | 5.5 | 6.3 | 6.1 |
| R&B Method [*4] | R&B Softening Point | ° C. | 94 | 102 | 159 | 108 | 161 |
| Measurement of Melt Viscosity [*5] | Melt Viscosity | Pa · s | 8 | 56 | 28 | 59 | 100 |

[*1] According to JIS K 7113
[*2] No data
[*3] Lower limit of measuring range or lower (−10° C. or lower)
[*4] Ring and Ball Method
[*5] Measured at 190° C. using B-type rotary viscometer The tackifier resin (C) used in Examples and Comparative Examples is described below.

<Tackifier Resin (C)>

"I-MARV P-125" (trade name, "I-MARV" is a registered trademark, manufactured by Idemitsu Kosan Co., Ltd., hydrogenated petroleum resin)

Examples 1 to 4 and Comparative Examples 1 to 5

The components (A) to (C) were blended in the ratio (part by mass) shown in Table 2, put into a stainless steel container having a volume of 1 L, and melted by heating at 180° C. for 30 minutes using a mantle heater. After melted, this was fully stirred with a rotary blade to produce a hot-melt adhesive. The resultant hot-melt adhesive was evaluated as follows.

[Melt Viscosity]

The melt viscosity was measured using a TVB-15 type Brookfield rotary viscometer (with an M2 rotor) at 180° C. according to JIS K-6862.

[Measurement of Softening Point: Ring and Ball Method]

The softening point was measured according to the ring and ball method based on JAI7-1991.

[Adhesive Performance Evaluation]

For the purpose of evaluating the adhesive performance of each hot-melt adhesive, a bonded test sample was produced and tested in a 180° peel test under the condition shown below.

<Production of Bonded Test Sample>

A hot roll bar coater was heated at 170° C., and the hot-melt adhesive obtained herein was applied to a PP film laminate (50 mm×100 mm) in a coating ratio of 60 g/m² or 30 g/m². Subsequently, the hot-melt adhesive-coated PP film laminate was bonded to MDF (middle-density fibrous board, shape: 50 mm×80 mm×5.5 mm), and while a 5 kg weight was put thereon, this was cooled at room temperature for 10 seconds to prepare an adhesiveness test sample. The weight was removed, and the adhesiveness test sample was kept in an environment at 23° C. and a humidity of 50% for 24 hours, thereby producing a test sample for measurement.

<180° Peel Test>

For the 180° peel test, an autograph AGS-X manufactured by Shimadzu Corporation was used. The sample was tested at a peeling rate of 100 mm/min and a peel length of 100 mm. The test sample for measurement was tested in a peeling direction of 180° in a peel test, in which the PP film laminate bonded with the hot-melt adhesive was peeled from MDF, and the destruction state of the adherend was confirmed.

Regarding the destruction state, those in material destruction (adherend destruction) were ranked as A, those in partial material destruction were ranked as B, and those in cohesion failure were ranked as C. Every case was tested 3 times for peeling and destruction state confirmation and the destruction state most frequently confirmed in 3 times of the test was referred to as the evaluation result of the case.

Precisely, every case where the hot-melt adhesive coating amount was 60 g/m² (destruction state at 60 g/m²) and where the hot-melt adhesive coating amount was 30 g/m² (destruction state at 30 g/m²) was tested 3 times and evaluated. The results are shown in Table 2.

As obvious from Table 2, it is known that the hot-melt adhesives for woodworking of Examples 1 to 4 have a low melt viscosity (high flowability) as compared with those of Comparative Examples 1 to 5, and are excellent in adhesion force.

Here, in Comparative Example 1 not using the olefinic polymer (B), the melt viscosity is high and the adhesion force is poor. In addition, the result is that, in Comparative Example 2 not using the propylenic polymer (A), the melt viscosity is further higher than in Comparative Example 1, and the adhesion force is poorer.

In Comparative Examples 3 to 5 where the content of the propylenic polymer is less than 31% by mass (30.8% by mass) relative to 100% by mass of the total of the propylenic polymer (A) and the olefinic polymer (B), the result is that the melt viscosity is high and the adhesion force is poor.

As opposed to these, in Examples 1 to 4 where the content of the propylenic polymer (A) falls within a range of 31 to 95% by mass relative to 100% by mass of the total of the propylenic polymer (A) and the olefinic polymer (B), it is known that hot-melt adhesives for woodworking satisfying both high flowability and excellent adhesiveness can be obtained.

INDUSTRIAL APPLICABILITY

The hot-melt adhesive for woodworking of the present invention is excellent in adhesiveness to wood substrate and its amount to be applied can be reduced, and therefore can be favorably used for bonding applications of bonding wood substrates to each other, or for bonding applications of bonding wood substrates to other various materials such as plastic materials, metal materials, etc.

The invention claimed is:

1. A hot-melt adhesive, comprising component (a) and component (b), wherein the content of the component (a) is 31 to 95% by mass relative to 100% by mass of the total amount of the component (a) and the component (b):
   (a) a propylenic polymer (A) having a tensile modulus of elasticity, as measured using a tensile tester and according to JIS K 7113, of 1 to 600 MPa, and having a glass

TABLE 2

| | | | Unit | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|---|---|
| Composition | Propylenic Polymer (A) | A1 | part by mass | 40.0 | 30.0 | 40.0 | 40.0 | 35.0 | — | 20.0 | 20.0 | 20.0 |
| | | A2 | part by mass | 10.0 | 20.0 | 10.0 | 10.0 | 30.0 | — | — | — | — |
| | Olefinic Polymer (B) | B1 | part by mass | 15.0 | 15.0 | — | — | — | 65.0 | 22.5 | 22.5 | — |
| | | B2 | part by mass | — | — | 15.0 | — | — | — | 22.5 | — | 22.5 |
| | | B3 | part by mass | — | — | — | 15.0 | — | — | — | 22.5 | 22.5 |
| | Tackifier (C) | | part by mass | 35.0 | 35.0 | 35.0 | 35.0 | 35.0 | 35.0 | 35.0 | 35.0 | 35.0 |
| Properties | Melt Viscosity *1 | | Pa·s | 9 | 12 | 11 | 13 | 14 | 15 | 14 | 17 | 21 |
| | R&B Softening Point *2 | | °C. | 105 | 98 | 88 | 109 | 90 | 153 | 146 | 152 | 147 |
| | Adhesiveness Performance | Destruction State at 60 g/m² | — | A | A | A | A | B | C | C | C | C |
| | | Destruction State at 30 g/m² | — | A | A | A | A | B | C | C | C | C |

*1 Measured using B-type rotary viscometer according to JIS K-6862.
*2 Measured by Ring and Ball method.

transition temperature (Tg), as measured by keeping 10 mg of a sample of the polymer in a nitrogen atmosphere at −10° C. for 5 minutes and then heating the sample at 10° C./min using a differential scanning calorimeter (DSC), of higher than −10° C.; and (b) an olefinic polymer (B) having a glass transition temperature (Tg), as measured by keeping 10 mg of a sample of the polymer in a nitrogen atmosphere at −10° C. for 5 minutes and then heating the sample at 10° C./min using a differential scanning calorimeter (DSC), of −10° C. or lower.

2. The hot-melt adhesive according to claim 1, wherein the content of the component (a) is 35 to 95% by mass relative to 100% by mass of the total amount of the component (a) and the component (b).

3. The hot-melt adhesive according to claim 1, wherein 70 mol % or more of the monomer constituting the propylenic polymer (A) is a propylene monomer.

4. The hot-melt adhesive according to claim 1, wherein the propylenic polymer (A) satisfies (1):
(1) [mmmm]=20 to 80 mol %.

5. The hot-melt adhesive according to claim 1, wherein the propylenic polymer (A) satisfies at least one of (2) to (5):
(2) [rrrr]/(1−[mmmm])≤0.1;
(3) [rmrm]≥2.5 mol %;
(4) [mm]×[rr]/[mr]$^2$≤2.0; and
(5) molecular weight distribution (Mw/Mn)<4.0.

6. The hot-melt adhesive according to claim 1, wherein the propylenic polymer (A) satisfies (6):
(6) a melting point (Tm-D) of the polymer, defined as the peak top observed on the highest temperature side in a melting endothermic curve obtained using a differential scanning calorimeter (DSC), keeping a sample of the polymer in a nitrogen atmosphere at −10° C. for 5 minutes, and then heating the sample at 10° C./min, is 0 to 120° C.

7. The hot-melt adhesive according to claim 1, wherein the olefinic polymer (B) is an olefinic copolymer (P) obtained through polymerization of ethylene and one or more α-olefin monomers each having 3 to 20 carbon atoms.

8. The hot-melt adhesive according to claim 7, wherein 10 mol % or more of the monomer constituting the olefinic copolymer (P) is an ethylene monomer.

9. The hot-melt adhesive according to claim 7, wherein the olefinic polymer (P) satisfies at least one of (p1) to (p3):
(p1) an ethylene structural unit is present in an amount of 10 mol % or more and 20 mol % or less;
(p2) a 1-butene structural unit is present in an amount of 20 mol % or more and 30 mol % or less; and
(p3) a propylene structural unit is present in an amount of 50 mol % or more and 70 mol % or less.

10. The hot-melt adhesive according to claim 1, comprising two or more kinds of the propylenic polymer (A).

11. The hot-melt adhesive according to claim 1, further comprising a tackifier resin (C).

12. A method of bonding woodworking substrates, comprising:
melting the hot-melt adhesive of claim 1, and applying the melted adhesive to a first substrate, and
bonding a second substrate to the melted adhesive on the first substrate.

* * * * *